US012183131B2

(12) United States Patent
Hoes et al.

(10) Patent No.: US 12,183,131 B2
(45) Date of Patent: Dec. 31, 2024

(54) ADAPTER FOR A DIAGNOSTIC INTERFACE OF A VEHICLE

(71) Applicant: HELLA GUTMANN SOLUTIONS GMBH, Ihringen (DE)

(72) Inventors: Thorsten Hoes, Waldkirch (DE); Ralf Gutekunst, Vogtsburg-Burkheim (DE)

(73) Assignee: HELLA GUTMANN SOLUTIONS GMBH, Ihringen (DE)

( * ) Notice: Subject to any disclaimer, the term of this patent is extended or adjusted under 35 U.S.C. 154(b) by 552 days.

(21) Appl. No.: 17/593,886

(22) PCT Filed: Mar. 21, 2020

(86) PCT No.: PCT/EP2020/057900
§ 371 (c)(1),
(2) Date: Sep. 27, 2021

(87) PCT Pub. No.: WO2020/193443
PCT Pub. Date: Oct. 1, 2020

(65) Prior Publication Data
US 2022/0189219 A1 Jun. 16, 2022

(30) Foreign Application Priority Data
Mar. 28, 2019 (EP) .................................... 19165982

(51) Int. Cl.
*G07C 5/08* (2006.01)
*G07C 5/00* (2006.01)
(52) U.S. Cl.
CPC ........... *G07C 5/0808* (2013.01); *G07C 5/008* (2013.01); *G07C 2205/02* (2013.01)

(58) Field of Classification Search
CPC ................................................ G07C 2205/02
See application file for complete search history.

(56) References Cited

U.S. PATENT DOCUMENTS

| 4,520,239 A * | 5/1985 | Schwartz ............... H02G 11/02 |
| | | 242/402 |
| 9,349,223 B1 * | 5/2016 | Palmer ................... H04L 67/12 |

(Continued)

FOREIGN PATENT DOCUMENTS

EP 3441266 A1 2/2019

OTHER PUBLICATIONS

"International Application Serial No. PCT/EP2020/057900, International Search Report mailed Jun. 16, 2020", w/ English Translation, (Jun. 16, 2020), 6 pgs.

(Continued)

*Primary Examiner* — Hongmin Fan
(74) *Attorney, Agent, or Firm* — Schwegman Lundberg & Woessner, P.A.

(57) ABSTRACT

Disclosed herein is an adapter comprising: a housing, a plug for connecting to a vehicle diagnostic interface of a vehicle, an extension cable connected to the plug, and a first communication unit connected to the extension cable. The first communication unit is designed to communicate wirelessly with a vehicle diagnostic device, a mobile terminal, with at least one vehicle control device connected to the vehicle diagnostic interface. The adapter further comprises a fastening means for attaching the housing to a vehicle exterior, a window pane, a vehicle door, a vehicle pillar, and/or a vehicle roof. Further disclosed is a method and a system comprising the adapter and a vehicle diagnostic device, and system comprising the adapter and a mobile terminal.

20 Claims, 5 Drawing Sheets

(56) References Cited

U.S. PATENT DOCUMENTS

Figure 1:
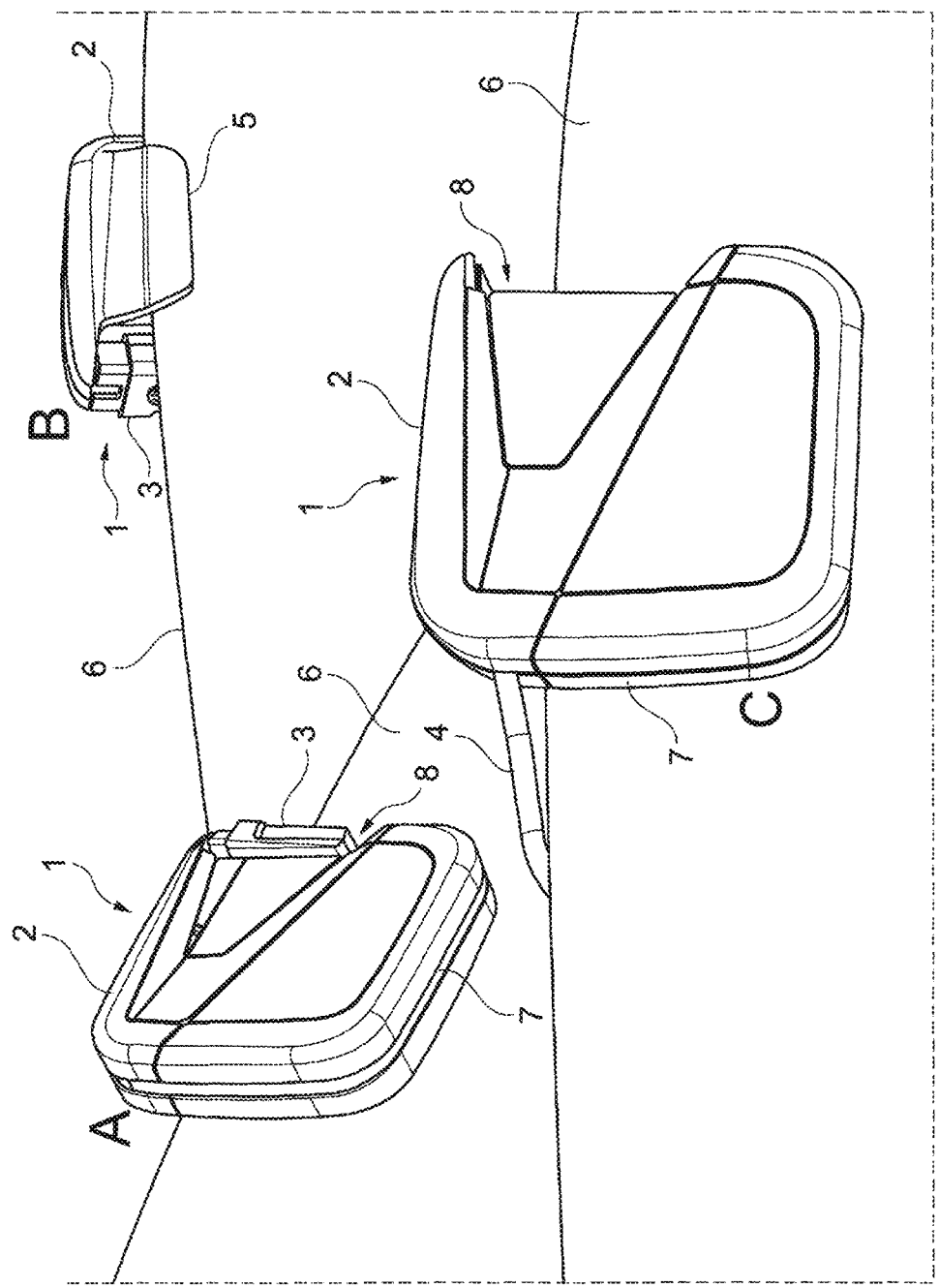

| | | |
|---|---|---|
| 2010/0096486 A1* | 4/2010 | Yang .................. H02G 11/02 |
| | | 191/12.4 |
| 2010/0105241 A1 | 4/2010 | Berkobin et al. |
| 2010/0179781 A1 | 7/2010 | Raphael |
| 2013/0246135 A1 | 9/2013 | Wang |
| 2015/0228127 A1 | 8/2015 | Ross |
| 2016/0013598 A1 | 1/2016 | Kirkpatrick et al. |
| 2017/0076515 A1 | 3/2017 | Nyalamadugu et al. |
| 2019/0126935 A1* | 5/2019 | Phillips ................ G07C 5/0808 |

OTHER PUBLICATIONS

"International Application Serial No. PCT/EP2020/057900, Written Opinion mailed Jun. 16, 2020", (Jun. 16, 2020), 5 pgs.
"European Application Serial No. 20 712 352.2, European Search Report dated Nov. 23, 2023", (Nov. 23, 2023), 6 pgs.
"Canadian Application Serial No. 3,134,638, Office Action dated Jan. 23, 2024", (Jan. 23, 2024), 4 pgs.
"Canadian Application Serial No. 3,134,425, Office Action dated Jan. 31, 2024", (Jan. 31, 2024), 4 pgs.

\* cited by examiner

ADAPTER FOR A DIAGNOSTIC INTERFACE OF A VEHICLE

PRIORITY APPLICATIONS

This application is a U.S. National Stage Filing under 35 U.S.C. § 371 from International Application No. PCT/EP2020/057900, filed on Mar. 21, 2020, and published as WO2020/193443 on Oct. 1, 2020, which claims the benefit of priority to European Application No. 19165982.0, filed on Mar. 28, 2019; the benefit of priority of each of which is hereby claimed herein, and which applications and publication are hereby incorporated herein by reference in their entireties.

The present invention relates to an adapter, which can communicate, on the one hand, by wire with a vehicle diagnostic interface of a vehicle and, on the other hand, wirelessly with an external vehicle diagnostic device and/or a mobile terminal. The invention further relates to two systems and to a method in which the adapter is provided.

Modern vehicles are complex electrical and mechanical systems that use many intercommunicating components to support safe and efficient vehicle operation. Such components can be susceptible to faults, failures and errors that can affect the operation of a vehicle. When such faults or errors occur, the affected component may trigger a corresponding error code, for example a Diagnostic Trouble Code (DTC). The error code is usually stored in a memory in the vehicle. After this, a warning signal can be emitted, for example, which prompts the driver to visit a workshop.

By means of an evaluation of the error codes (vehicle diagnostics), a statement can be made as to which vehicle components are defective and require repair. For this purpose, a vehicle diagnostic interface is provided, which is often located in the driver's footwell. Usually an external vehicle diagnostic device is connected to the vehicle diagnostic interface to read out the stored error codes. After this, the error codes are analysed by the vehicle diagnostic device in order to diagnose which components need to be repaired or replaced to correct the problem. Such vehicle diagnostic devices have proven their worth in everyday workshop use.

Up to now, the diagnostic devices have been connected to the diagnostic interface with an extension cable, for example. However, such an extension cable can be unwieldy in everyday workshop use. Furthermore, it is sometimes desirable to carry out the diagnostics by the vehicle diagnostic device outside the vehicle. Wireless communication of the diagnostic device with the vehicle suffers from increasingly difficult radio conditions due to the shielding of the radio waves by the metallic bodywork or metal-covered windows.

It would thus be desirable to find a practical solution to the problems described.

According to the invention, this object is achieved by an adapter, a method and a system according to the independent claims. Advantageous refinements are described in the following description and in the dependent claims.

Accordingly, an adapter is provided comprising:
a housing,
a plug for connecting to a vehicle diagnostic interface of a vehicle,
an extension cable connected to the plug,
a first communication unit connected to the extension cable, which first communication unit is designed to communicate wirelessly with a vehicle diagnostic device and/or a mobile terminal and/or to communicate with at least one vehicle control device connected to the vehicle diagnostic interface, and
a fastening means for attaching the housing to a vehicle exterior, a window pane, in particular a partially lowered window pane, a vehicle door, a vehicle pillar and/or a vehicle roof.

The invention thus provides an additional adapter which, on the one hand, can communicate by wire with a vehicle control device on the vehicle and, on the other hand, can communicate wirelessly with an external vehicle diagnostic device or an external mobile terminal. It should be noted here that the adapter, the vehicle diagnostic device, the mobile terminal and the vehicle control device are separate but connectable objects. The adapter thus creates the prerequisite for good radio quality or a wireless communication connection to a device located outside the vehicle. On the other hand, the fastening means can be used to produce a temporary, detachable mechanical connection between the housing and the vehicle.

Through the plug, the extension cable and the fastening means, the adapter can be connected to the vehicle diagnostic interface and attached to the vehicle in such a way that a wireless connection can be established and/or maintained between the adapter and the vehicle diagnostic device or the mobile terminal in spite of many metallic vehicle parts.

The housing can be designed in such a way that it protrudes at least partially from an interior of the vehicle after it has been attached to the vehicle. For example, the first communication unit is arranged at least partially outside the vehicle in said position of the adapter. This means that wireless communication of the first communication unit is not disturbed by chromed windows or metal parts of the vehicle.

With the fastening means, the adapter can be easily fitted to and removed again from the vehicle. The adapter and the vehicle are therefore mechanically separate but connectable objects. The housing is typically attached to the vehicle temporarily, i.e. only for the duration of a vehicle diagnostics. After use, the adapter is removed from the vehicle by loosening the fastening means. The fastening means may be an integral part of the housing or may be connected to the housing. The material of the fastening means can be made from the same material as the housing. Alternatively, the material of the fastening means may be different from the housing material. The fastening means may include, for example, a protrusion, a bracket, a hook, a clamp, a suction cup and/or a magnet. A hook-and-loop fastening would also be conceivable. In particular, the fastening means is designed as a detachable fastening, especially one that can be removed non-destructively. The fastening means can be used to attach the housing to the vehicle in an interlocking and/or frictionally engaged manner.

The fastening means and/or the housing of the adapter may each have at least one anti-slip body designed to prevent or reduce a relative movement between the adapter (for example the housing and/or fastening means) and the vehicle (for example at the connection point of the vehicle, such as window pane, partially lowered window pane, vehicle door, vehicle pillar and/or vehicle roof). The anti-slip body can therefore impart static friction between the adapter and the vehicle, thus reducing or preventing movement of the adapter relative to the vehicle. The anti-slip body can also be designed to damp mechanical vibrations of the adapter relative to the vehicle. To prevent scratches on the vehicle, the anti-slip body can be made of a soft, elastic material. The slip-resistant body may comprise, for example, an elastic layer and/or a solid foam. For example, the body is formed from plastic, rubber, natural rubber, synthetic rubber such as silicone rubber or acrylic rubber. The anti-slip body is usually provided on the fastening means and/or on the housing in such a way that it abuts the vehicle or at least contacts the vehicle after the housing has been fastened to the vehicle. The at least one anti-slip body can be designed as a protrusion which protrudes from the fastening element or the housing.

A side window of the vehicle has an inner side facing the vehicle interior and an outer side. Often the side window slopes upwards towards the centre of the vehicle. Therefore, when fastened to the outer side of the side window, the housing typically rests on the window pane. It is often desirable to attach the housing to the inner side of the side window. According to one embodiment, the fastening means and/or the housing are designed in such a way that the housing abuts the window pane when the adapter is mounted on the inner side and/or on the outer side of the window pane. By resting the housing on the window pane, relative movements between the housing and the window pane can be reduced, for example when closing the vehicle door. The exact design can be adjusted here, for example, taking into account the centre of gravity of the adapter via a suitable choice of the shape of the housing and/or the shape/position of the fastening means and/or the position of the anti-slip body. The fastening means is preferably located in an upper area of the housing. The anti-slip body can be provided in the lower area of the housing and can preferably abut the window pane. The indications "upper area" and "lower area" here refer in particular to the orientation of the housing when the housing, during intended use, is attached to the window pane.

The adapter may further comprise a winding unit for winding the extension cable. In one embodiment, the winding unit has a winding groove or a winding drum for completely receiving the extension cable. This is intended to prevent the extension cable from protruding in a rest position (parked position) of the adapter.

When the extension cable is completely received by the winding unit, this can be called the rest position of the adapter. The adapter thus offers a compact, clean workshop solution.

As a rule, the extension cable has at least two signal cores. The extension cable has a diameter that typically depends on the number of cores used, the cross-section of each of the cores, a possible twisting and an additional shielding. The diameter of the extension cable can be, for example, at least 6 mm and/or at most 15 mm. To prevent the extension cable from being damaged or kinked during winding, it is advantageous if the winding unit has a radius of curvature of at least six times an outer diameter of the extension cable. The radius of curvature of the winding unit can be, for example, less than twelve times the outer diameter of the extension cable or less than ten times the outer diameter of the extension cable. By limiting the radius of curvature, the adapter can be kept compact. Accordingly, the extension cable wound on the winding unit may approximately have a bending radius of at least six times the outer diameter. The bending radius can be locally exactly as large or at least as large as the mentioned radius of curvature. If the cable is wound around the winding unit several times, the bending radius of the extension cable may increase each additional time it is wrapped around.

A receptacle may be provided in the housing to receive the plug when the adapter is in the rest position. After winding up the extension cable, the plug can be inserted into the receptacle provided. The receptacle can have a shape that is complementary to the plug. The vehicle diagnostic interface is typically designed as a socket. Said receptacle may have a shape corresponding to the vehicle diagnostic interface designed as a socket. It may be provided that the housing has locking means for locking the plug in the receptacle. This prevents the plug from slipping out of the receptacle undesirably and increases the operational reliability of the adapter.

In particular, the plug can be mechanically and electrically connected to the vehicle diagnostic interface of the vehicle.

The extension cable should not be too long, so as to avoid protruding contours of the extension cable. Furthermore, problems with signal propagation times and electromagnetic compatibility can be reduced by using a short extension cable. On the other hand, the extension cable should be long enough for the adapter to be fastened to the vehicle as described above. Typically, the extension cable has a length of at least 0.5 metres and/or at most 2 metres.

The adapter can have its own power supply. The power supply may be or may comprise a battery or a rechargeable battery. It may also be provided that the power supply comprises an antenna or a coupling coil for inductive charging. Alternatively or additionally, the adapter can obtain the power necessary for its operation from the vehicle via the extension cable and the vehicle diagnostic interface.

The adapter may have a control unit such as a microcontroller, a processor, a microprocessor and/or a digital signal processor. The adapter, in particular the control unit of the adapter, can be designed to handle or process or evaluate received data from the vehicle diagnostic device and/or from the vehicle control device.

Furthermore, the adapter may have at least one memory, such as random access memory (RAM), read only memory (ROM), a hard drive, a magnetic storage medium and/or an optical drive. A program can be stored in the memory, for example a software for controlling the first communication unit.

The first communication unit may, for example, comprise at least one transmitter and receiver unit, and as such may be designed for bidirectional communication both with the vehicle diagnostic device or the mobile terminal and with the vehicle control device. Typically, the first communication unit comprises a first transmitter and receiver unit which is designed for wired communication with the vehicle control device. Further, the first communication unit may comprise a second transmitter and receiver unit designed for wireless communication with the vehicle diagnostic device and/or the mobile terminal. The first transmitter and receiver unit and the second transmitter and receiver unit can be connected to each other, either directly or via the above-mentioned control unit. The control unit of the adapter can control a communication between the first transmitter and receiver unit and the second transmitter and receiver unit. If necessary, data can be temporarily stored or buffered in a memory (for example as described above) before being forwarded.

In one embodiment, the first communication unit is designed to transmit data between the vehicle diagnostic device and the vehicle control device or between the mobile terminal and the vehicle control device.

The first communication unit can be designed to
  receive data from the vehicle diagnostic device and/or the
    vehicle control device and/or the mobile terminal.
Further, the first communication unit and/or the control unit of the adapter can be designed to
  carry out a specific action after receiving the data.

The specific action includes, for example
forwarding the data to the at least one vehicle control device or to the vehicle diagnostic device or the mobile terminal and/or
processing the data of the vehicle control device and/or evaluating the data of the vehicle control device.

The data may include, for example, at least one data packet, vehicle data, a message, a confirmation, a request and/or a command, such as a control command. If the data come from the vehicle diagnostic device, the data may contain, for example, a message, a request, a confirmation or a control command from the vehicle diagnostic device to the vehicle control device. If the message comes from the vehicle control device, the data may contain, for example, vehicle data, a request or a confirmation. The vehicle data may include, for example, sensor readings, error codes and/or a vehicle identification, such as a vehicle identification number.

If the data come from the mobile terminal, the data may include, for example, a message, a request, a confirmation or a control command from the mobile terminal to the vehicle control device or the adapter. The evaluation of the data (see above), such as sensor readings and error codes, from the vehicle control device can in particular include a fault diagnosis.

In order to maintain a communication between the first communication unit and the vehicle control device and/or the vehicle diagnostic device and/or the mobile terminal, a so-called "keepalive signal" (maintenance signal) can be sent from the first communication unit to the vehicle control device and/or vehicle diagnostic device and/or to the mobile terminal. This is preferably done at regular intervals.

The adapter may also have an input and output unit for communication with a user. There are usually two cases of use after attaching the vehicle adapter to the vehicle: the user is sitting in the vehicle or he is outside the vehicle. The input and output unit is preferably designed or positioned on the housing in such a way that user communication can be used on the two opposite sides of the adapter. The first communication unit is designed, for example, after a specific input by a user at the input and output unit, to establish a communication connection to the vehicle diagnostic device, to establish a communication connection to the vehicle control device, to establish a communication connection to the mobile terminal or to receive and/or forward data, for example from the vehicle control device to the vehicle diagnostic device or vice versa.

The invention also proposes a system comprising the adapter of the type described above and a vehicle diagnostic device. The vehicle diagnostic device can for example have
a second communication unit for wireless communication with the first communication unit of the adapter, and
a control and processing unit for evaluating vehicle data and/or controlling the vehicle control device.

Furthermore, a memory and/or an input and output unit may be provided in the vehicle diagnostic device.

For example, the vehicle diagnostic device can determine an identification of the vehicle based on the vehicle identification described above. Further, the vehicle diagnostic device can determine at least one potentially defective component in the vehicle based on the sensor readings and/or the error codes. The vehicle diagnostic device can be designed to communicate with other devices, networks or the internet using the second communication unit. The system may further comprise a vehicle control device and/or sensors connected thereto.

With this system, the vehicle diagnostic device can carry out the vehicle diagnostics while the adapter transmits the data from the vehicle control device to the vehicle diagnostic device.

The invention proposes a further system. The system comprises the adapter of the type described above and a mobile terminal. The mobile terminal may, for example, have a third communication unit designed to communicate wirelessly with the first communication unit of the adapter. In this case, the adapter preferably comprises a control and processing unit designed to evaluate the data from the vehicle control device.

The mobile terminal may further comprise a control unit, an input and output unit and/or a memory. The mobile terminal can be, for example, a tablet, a mobile phone, a smartphone, a laptop and/or a notebook. The input and output unit can comprise, for example, a touch-sensitive screen (touchscreen).

For example, the adapter can determine an identification of the vehicle based on the vehicle identification described above. Furthermore, the adapter (or the control and processing unit of the adapter) can be designed to evaluate sensor readings and/or error codes. Based on the evaluation, the adapter can determine at least one potentially defective component in the vehicle. Thus, the adapter can be designed to carry out a vehicle diagnostics based on the sensor readings and/or the error codes. Furthermore, the adapter can be designed to send the results of the vehicle diagnostics and/or the evaluation of the error codes and/or the sensor readings to the mobile terminal. The input and output unit of the mobile terminal can be designed to display the results or the evaluation. The mobile terminal can be designed to communicate with other devices, networks or the Internet using the third communication unit. The system may further comprise a vehicle control device and/or sensors connected thereto.

With this system, vehicle diagnostics can therefore take place in the adapter, while user communication is enabled, for example through the mobile terminal.

A method for use of the previously described adapter is also proposed. The method comprises at least the following steps:
connecting the plug to the vehicle diagnostic interface,
attaching the housing to the vehicle exterior, to the window pane, in particular the partially lowered window pane, the vehicle door, the vehicle pillar and/or the vehicle roof by means of the fastening means,
establishing a communication connection between the first communication unit of the adapter and the vehicle control device, and
establishing a communication connection between the first communication unit of the adapter and the vehicle diagnostic device or the mobile terminal.

The fastening of the housing to the vehicle by means of the fastening means is usually temporary. The housing is typically only attached to the vehicle for the duration of a vehicle diagnostics. When the vehicle diagnostics is finished, the mechanical connection of the fastening means is released and the housing is removed from the vehicle. The vehicle diagnostics usually takes less than two hours, preferably less than one hour. The method may thus typically comprise the following step: disconnecting the mechanical connection of the fastening means from the vehicle after the vehicle diagnostics has been carried out. Alternatively or additionally, the mechanical and/or electrical connection to the vehicle diagnostic interface in the vehicle is disconnected after the vehicle diagnostics has been carried out. The communication connection to the vehicle control device can also be terminated after the vehicle diagnostics has been carried out. The communication connection to the mobile device and/or the vehicle diagnostic device can optionally be maintained or terminated after the vehicle diagnostics.

Optionally, the method comprises at least one of the following steps:
- transferring data between the vehicle diagnostic device and the vehicle control device,
- transferring data between the mobile terminal and the vehicle control device,
- receiving error codes and/or sensor readings by the adapter,
- forwarding the error codes and/or sensor readings to the vehicle diagnostic device,
- carrying out vehicle diagnostics by the vehicle diagnostic device,
- receiving error codes and/or sensor readings by the adapter,
- carrying out vehicle diagnostics by the adapter and/or
- transmitting the results of the vehicle diagnostics to the mobile terminal.

It should be emphasised here that features mentioned only in relation to the adapter or the vehicle diagnostic device or the vehicle control device or the system can also be claimed for the stated method and vice versa. It is understood that the embodiments described above may be combined with each other, provided that the combinations are not mutually exclusive.

Figure 2:
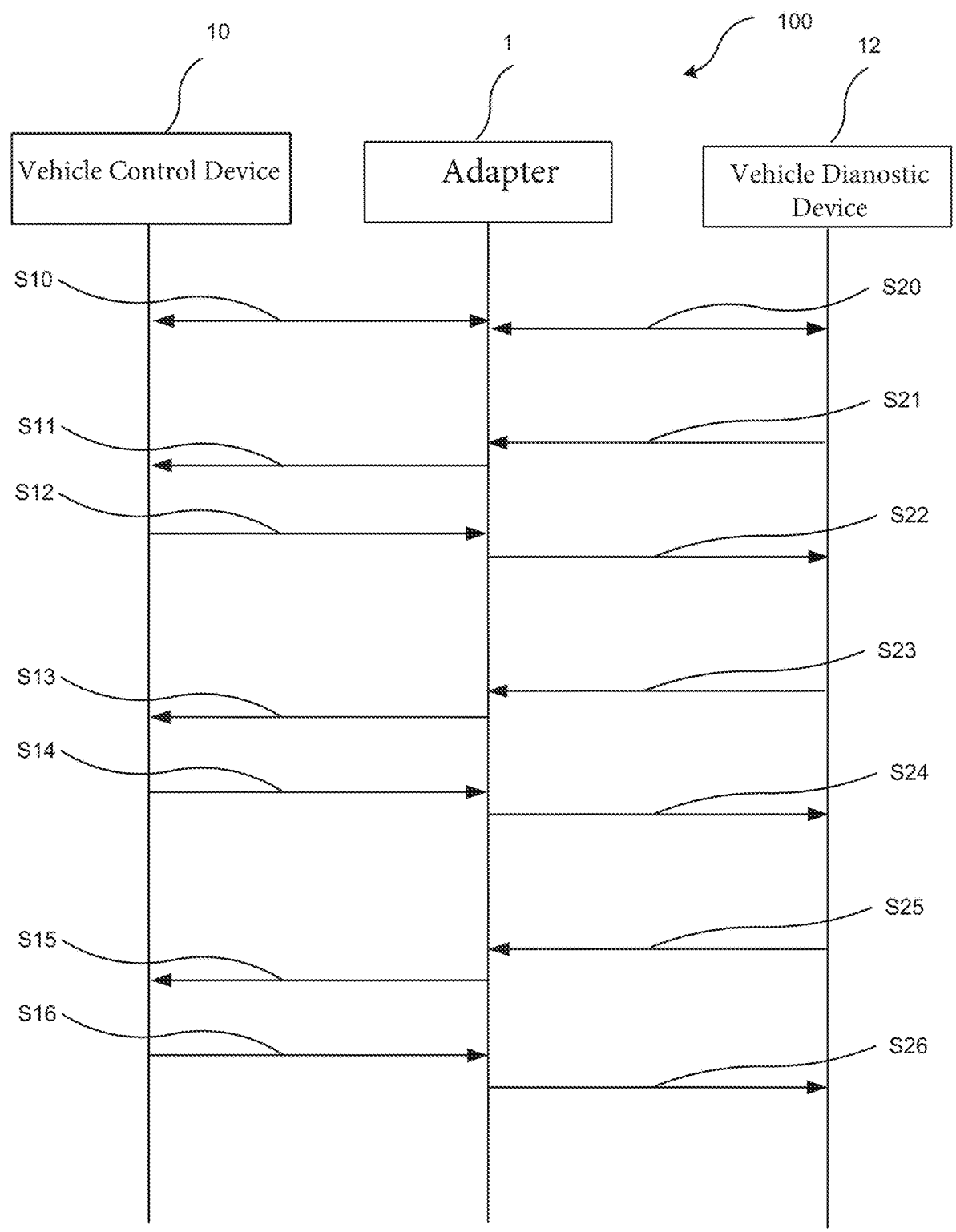
Figure 3:
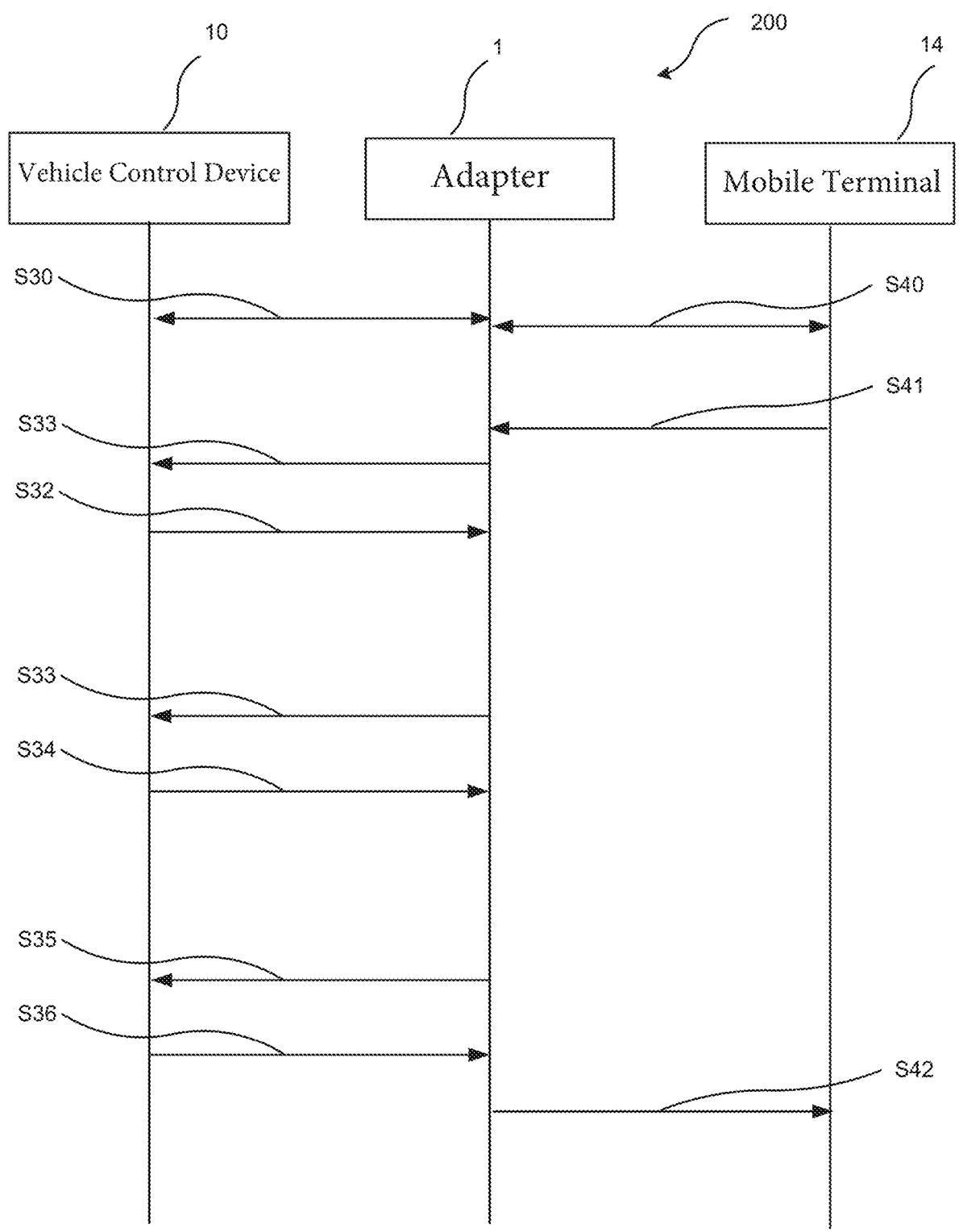
Figure 4:
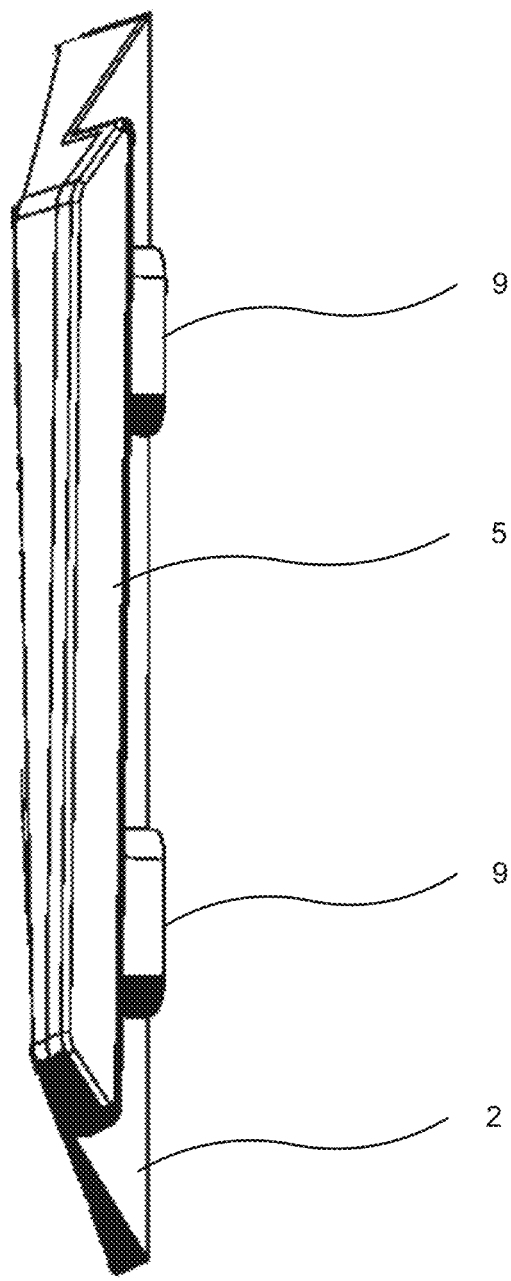
Figure 5:
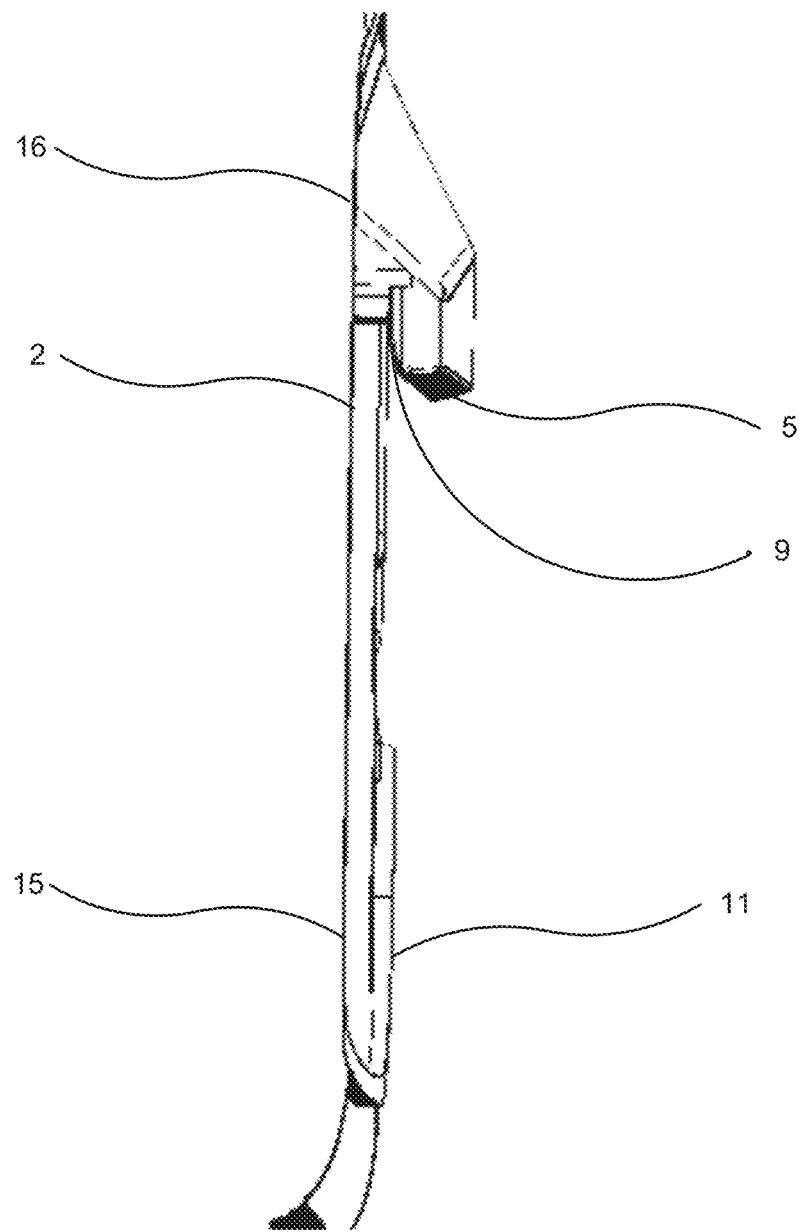

In the following, embodiments of the invention are explained in greater detail with reference to the accompanying drawings. The figures are schematised and partially simplified. They show:

FIG. 1 different schematic views of an adapter attached to a window pane,

FIG. 2 a schematic representation of a system and communication between components of the system, FIG. 3 a schematic representation of a system and communication between components of the system, FIG. 4 a schematic view of a fastening means for fastening the adapter to the vehicle, and FIG. 5 a section of a part of the adapter.

In the figures, recurring features are provided with the same reference signs.

FIG. 1 shows various schematic views of an adapter 1. The adapter comprises a housing 2, a plug 3, an extension cable 4 and a fastening means 5.

The plug 3 is designed to be connected to a vehicle diagnostic interface of the vehicle, also known as an OBD interface (On-Board Diagnostics interface). As a rule, the vehicle diagnostic interface is located in a footwell of the vehicle and is designed as a socket. The plug 3 usually has a standardised shape that is compatible with the vehicle diagnostic interface. When connecting the plug to the vehicle diagnostic interface, both are connected to one another electrically and mechanically.

The vehicle diagnostic interface is connected to at least one vehicle control device 10 located in the vehicle via corresponding signal lines. The vehicle control device 10 is in turn connected to at least one sensor, which is designed to record measured values of a vehicle parameter. The functioning of the sensor and the communication between the sensor and the vehicle control device 10 are known from the prior art and are only briefly outlined below. Thus, the at least one sensor can monitor the operating status and operating condition of components of the vehicle. The sensors can measure a wide range of vehicle parameters. The various sensors measure, for example, an engine temperature, a battery voltage, a fluid flow rate, an oil temperature, a tyre pressure, a transmission speed, a wheel speed, an exhaust control function, etc. The at least one sensor may be designed to acquire signals, data or measured values (sensor readings) at regular intervals, for example hourly, daily, monthly or after each engine start. The sensor can also be designed to record sensor readings only after a corresponding command from the vehicle control device 10. The sensor can send the sensor readings to the vehicle control device at regular intervals. Furthermore, the sensor can be designed to send sensor readings to the vehicle control device only after falling below or exceeding a limit value. The sensor readings can be temporarily stored or permanently stored in a memory of the vehicle designed for this purpose.

The housing 2 of the adapter 1 may have a receptacle 8 into which the plug 3 can be inserted if the plug 3 is not connected to the vehicle diagnostic interface (see FIG. 1A and FIG. 1B). This position can be called the rest position or parked position of the adapter 1 or the plug 3. To prevent the plug 3 from slipping out of the receptacle 8 unintentionally, a locking means can be provided to lock the plug in the receptacle 8 (not shown). Conceivable locking means are, for example, locking bolts, screws, clamping devices, tensioning devices, a magnetic lock and/or hook-and-loop fastener. The locking means may also comprise a gecko-like connection based on van der Waals forces and/or electrostatic charges.

Optionally, the adapter 1 has a winding unit 7 for winding the extension cable 4. The winding unit 7 can, for example, be a winding groove (see FIG. 1) or winding drum to completely receive the extension cable 4. This can prevent protruding contours or loops of the extension cable 4.

As indicated above, the adapter 1 comprises an extension cable 4 connected to the plug 3. The extension cable 4 connects the plug 3 to a first communication unit (see below) and typically has a length of approximately 0.5 m to 2 m, preferably between 1 m and 1.5 m. The extension cable 8 may comprise at least two signal cores. Via the extension cable 4, communication takes place between the first communication unit of the adapter 1 and the vehicle control device 10 on the lowest protocol layer, for example with the aid of
- ISO 11898 (CAN),
- ISO 9141 (K-line) and/or
- SAE J1850 (pulse width controlled)

(see also below). There may be other protocols in the higher layers.

An Ethernet-based vehicle communication based on ISO 13400 (DoIP) is integrated within the scope of requirements for a higher data throughput (previously CAN with 500 kb/s). For this purpose, preferably no additional cable is laid, but the low-frequency signal lines and the higher-frequency signal lines (100 Mb/s) are bundled in the extension cable 4.

The diameter of the extension cable 4 is typically dependent on the number of cores, the corresponding cross section, a possible twisting and an additional shielding and can be, for example, between 8 mm and 12 mm. To avoid damage to the extension cable 4 (for example due to excessive bending or kinking of the extension cable 4) and problems regarding signal propagation times, the extension cable 4 should have a minimum bending radius to be observed during winding onto the winding unit 7. A radius of curvature r of the winding unit 7 is therefore preferably designed according to the bending radius of the extension cable 4 to be maintained.

The following formula can be used to determine the radius of curvature r: r=X*outer diameter of the extension cable 4. The factor X depends, among other things, on the material of the extension cable 4 and can be determined empirically. For example, the factor X can be at least 4, 5, or 6. Further, the factor X can have a maximum value of 12 or 10. In the exemplary embodiment in the figure, the extension cable 4 has an outer diameter of approximately 9.7 mm. The factor X is furthermore preferably 8, so that the bending radius of the winding unit in the shown exemplary embodiment is approximately 78 mm.

The fastening means 5 is designed to fasten the housing 2 to a vehicle exterior, a window pane 6, in particular a partially lowered window pane 6 (see FIG. 1), a vehicle door, a vehicle pillar and/or a vehicle roof. Preferably, the fastening means 5 is designed in such a way that the housing 2 protrudes at least partially from an interior of the vehicle after it has been attached to the vehicle. This can improve the quality of the radio signals received and transmitted by the first communication unit. For example, the fastening means 5 comprises a bracket, hook-and-loop fastener, a hook, a clamp, a suction cup and/or a magnet. In FIG. 1, the fastening means is an integral part of the housing 2 and forms a hook or protrusion on the housing 2 by means of which the housing 2 can be hung on the window pane 6. Thus, the housing 2 and the hook 5 are on opposite sides of the window pane 6.

Further details of the fastening means 5 are indicated in FIGS. 4 and 5. The fastening means 5 is located in an upper area 16 of the housing 2. In FIG. 4 it can be seen that the fastening means 5 has at least one anti-slip body 9. For example, FIG. 4 shows two anti-slip bodies 9 attached to the inside of the hook 5, which are designed as elastic soft components and inhibit a "slipping" of the housing 2 when the side windows 6 are cut at an angle in the direction of travel. The anti-slip bodies 9 abut the side window 6 when the adapter 1 is attached to the side window 6 as intended. The anti-slip bodies 9 impart static friction between the housing 2 and the vehicle, thus minimising a relative movement of the adapter 1 in relation to the vehicle. The slip-resistant bodies 9 can be made of a plastic or a rubber (natural rubber or synthetic rubber), for example. The anti-slip bodies 9 can also damp vibrations of the housing 2 relative to the vehicle.

The side windows 6 of many vehicles slope upwards towards the centre of the vehicle. As a further feature, the fastening means 5 and the housing 2 can be designed (for example via a suitable choice of geometry and centre of gravity) in such a way that, when mounted both on the inside of the vehicle and on the vehicle exterior, the housing 2, in particular a lower area 15 of the housing 2, abuts the side window 6 (and does not swing back and forth). This has the advantage that the adapter 1 does not cause any vibrations or rattling on the window pane 6 when the vehicle door is closed. Preferably, at least one anti-slip body 11 is also provided in the lower area 15 of the housing 2. The anti-slip bodies 9, 11 can be formed as projections which protrude from the fastening element 5 or the housing 2.

As indicated above, the adapter 1 also comprises a first communication unit, which is connected to the extension cable 4. Overall, the adapter 1 can be connected to the vehicle diagnostic interface and attached to the vehicle by means of the plug 3, the extension cable 4 and the fastening means 5, in such a way that, on the one hand, the first communication unit can communicate by wire with the vehicle control device 10 and, on the other hand, the first communication unit can communicate wirelessly, in a manner undisturbed by the metallic vehicle, with a vehicle diagnostic device 12 (cf. FIG. 2) or a mobile terminal 14 (see FIG. 3). Depending on the embodiment, the first communication unit is designed to transmit data between the vehicle diagnostic device 12 and the vehicle control device 10 or between the mobile terminal 14 and the vehicle control device 10.

Typically, the first communication unit comprises a first transmitter and receiver unit (not shown), which is designed for wired communication with the vehicle control device 10. Further, the first communication unit may comprise, for example, a second transmitter and receiver unit (not shown) for wireless communication with the vehicle diagnostic device 12 or the mobile terminal 14, which typically operates according to a previously known radio standard or radio protocol. In particular, the first communication unit may comprise a Bluetooth unit, a WLAN (for example according to IEEE 802.11) or another unit designed to communicate via a near-field connection with a second communication unit of the vehicle diagnostic device 12 or a third communication unit of the mobile terminal 14. Other wireless connections such as EnOcean, Z-Wave, ZigBee, WiMAX, UMTS/HSDPA, LTE (long term evolution), NanoNetm, UWB (Ultra Wideband), NB-IoT (Narrowband Internet of Things), Sigfox or LoRa are also possible for the communication of the first communication unit and are known to a person skilled in the art.

The first transmitter and receiver unit and the second transmitter and receiver unit of the adapter 1 may be connected to each other, either directly or via a control unit, such as a processor or a controller. The control unit of the adapter 1 can control a communication between the first transmitter and receiver unit and the second transmitter and receiver unit of the adapter 1. In addition, the control unit controls the communication with the vehicle control device 10 and the vehicle diagnostic device 12 or the mobile terminal 14. The control unit of the adapter 1 may be designed to handle or to process received data from the mobile terminal 14 and/or from the vehicle diagnostic device 12 and/or from the vehicle control device 10. If necessary, data can be temporarily stored or buffered in a memory designed for this purpose before being forwarded to another component. A program for controlling the electronic components of the adapter 1 can be stored in the memory.

In the following, only the first communication unit will be referred to for the sake of simplicity. However, it is clear that the communication with the vehicle control device 10 may in particular run via said first transmitter and receiver unit of the adapter 1 and that the communication with the vehicle diagnostic device 12 may preferably run via said second transmitter and receiver unit of the adapter 1 and that the communication with the mobile terminal 14 may run via the second transmitter and receiver unit of the adapter 1.

In particular, the first communication unit is designed to receive data from the mobile terminal 14 and/or from the vehicle diagnostic device 12 and to receive data from the vehicle control device 10. Furthermore, the first communication unit is designed to forward the corresponding data to the at least one vehicle control device 10 or the vehicle diagnostic device 12 or the mobile terminal 14. The data received and forwarded by the first communication unit comprises, for example, at least one data packet, vehicle data, a message, a request (enquiry), a confirmation and/or a command. Here, the vehicle data usually include sensor readings, error codes and/or a vehicle identification, such as a vehicle identification number.

In addition, the adapter 1 may have an input and output unit for communication with a user, such as a vehicle mechanic or technician. The first communication unit is designed to establish a communication connection to the vehicle diagnostic device 12, to establish a communication connection to the mobile terminal 14, to establish a communication connection to the vehicle control device 10 or to receive and/or forward data after a specific input by a user at the input and output unit. For power supply, the adapter 1 usually has a rechargeable battery. It may also be provided that the adapter comprises an antenna or coupling coil for inductive charging. Alternatively or additionally, the adapter can obtain the power necessary for its operation from the vehicle via the extension cable 4 and the vehicle diagnostic interface.

The aim of vehicle diagnostics is to be able to determine which component in the vehicle is defective and how this component can be repaired. In order to be able to determine which component of the vehicle is defective, the vehicle diagnostic device 12 usually needs error codes (Dynamic Trouble Codes, DTC), which are generated during ongoing operation of the vehicle via an evaluation of the sensor measurement values by the at least one vehicle control device 10.

According to a conventional solution, the vehicle diagnostic device 12 is connected directly to the vehicle diagnostic interface. In this case, the vehicle diagnostic device 12 may communicate directly with the vehicle control device to obtain the required error codes from the vehicle control device 10. However, according to the present invention, the adapter 1 is interposed. This means that the vehicle diagnostic device 12 does not need to be in the vehicle during the vehicle diagnostics. All in all, everyday workshop life can be made more flexible with the help of the additional adapter 1.

FIG. 2 shows a system 100 comprising the aforementioned components 1, 10, 12. In the following, the communication between the devices 1, 10 and 12 is explained in more detail with reference to FIG. 2. Instead of the first communication unit of the adapter 1 and the second communication unit of the vehicle diagnostic device 12, reference is made to the adapter 1 and the vehicle diagnostic device 12 respectively in the following and in FIG. 2 for the sake of simplicity.

First, a communication connection is established between the adapter 1 and the vehicle control device 10 (S10). Afterwards (or before or at the same time), a communication connection is established between the adapter 1 and the vehicle diagnostic device 12 (S20). Now, the adapter 1 is able to mediate communication or data between the vehicle diagnostic device 12 and the vehicle control device 10.

Typically, identification of the vehicle is required so that the vehicle diagnostic device 12 can assign the error codes to a specific vehicle type. Therefore, (S21) the vehicle diagnostic device 12 sends a request to identify the vehicle to the adapter 1, which forwards the request to the vehicle control device 10 (S11). The vehicle control device 10 then transmits (S12) the vehicle identification number (VIN) of the vehicle, which number may be stored in a memory in the vehicle, to the vehicle diagnostic device 12 (S22) via the adapter 1. In alternative embodiments, the vehicle identification is entered manually by a technician or vehicle mechanic at the adapter 1 or at the vehicle diagnostic device 12. Now, the VIN is known to the vehicle diagnostic device 12.

According to this, the vehicle diagnostic device 12 can, for example, request error codes from the vehicle control device 10. For example, the adapter 1 forwards the request from the vehicle diagnostic device 12 to the vehicle control device 10 (S23, S13). The vehicle control device 10 then sends (S14) the requested error codes to the adapter 1, which sends (S24) the error codes to the vehicle diagnostic device 12. After receipt, the error codes can be analysed or evaluated by the vehicle diagnostic device 12.

For a more accurate diagnosis, the vehicle diagnostic device 12 may additionally request sensor readings from the vehicle control device 10. This is done, for example, via a request that is forwarded from the adapter 1 to the vehicle control device 10 (S25, S15). The vehicle control device 10 retrieves the requested sensor readings, for example, from a vehicle memory or addresses corresponding vehicle sensors to issue or acquire the sensor readings. The sensor readings are then sent from the vehicle control device 10 to the adapter 1 (S16) and from the adapter 1 to the vehicle diagnostic device 12 for further evaluation or processing (S26). Based on the error codes and sensor readings, the vehicle diagnostic device 12 can determine which component in the vehicle is defective and requires repair.

At this point it should be noted that certain transmitting and receiving steps can be combined. For example, steps S21 and S23; S11 and S13; S12 and S14; and S22 and S24 can in each case be combined.

Further, the vehicle diagnostic device 12 can send commands to the vehicle control device 10 via the adapter 1. For example, a command to the vehicle control device comprises a setting of the sensor or a change of the setting of the sensor, wherein the setting includes, for example, a sensitivity of the sensor, a frequency of the measurements and/or a timing of the measurements.

Additionally or alternatively, the status of the vehicle control device 10 may be changed or set by the vehicle diagnostic device 12 via a corresponding message. Conceivable in this context would be, for example, inspection interval, control of actuators or the like.

The vehicle control device 10 may also receive new software components or updates, which the vehicle diagnostic device 12 sends to the relevant vehicle control device 10 via the adapter 1. In order to maintain a communication between the adapter 1 and the vehicle control device 10 and/or between the adapter 1 and the vehicle diagnostic device 12, a so-called "keepalive signal" (maintenance signal) can be sent from the first communication unit to the vehicle control device 10 and/or vehicle diagnostic device 12. This is preferably done at regular intervals.

It is understood that the embodiments shown in FIGS. 1 and 2 and described above may be combined with one another, provided that the combinations are not mutually exclusive. Features mentioned only in relation to the adapter 1 can also be claimed for the system or the method and vice versa.

FIG. 3 shows a system 200 comprising the aforementioned components 1, 10, 14. In the following, the communication between the devices 1, 10 and 14 is explained in more detail with reference to FIG. 3. Instead of the first communication unit of the adapter 1 and the third communication unit of the mobile terminal 14, reference is made to the adapter 1 and the mobile terminal 14 respectively in the following and in FIG. 3 for the sake of simplicity.

The mobile terminal 14 may have a control unit, an input and output unit and/or a memory. The mobile terminal can be, for example, a tablet, a mobile phone, a smartphone, a laptop and/or a notebook. The input and output unit of the mobile terminal 14 can comprise, for example, a touch-sensitive screen (touchscreen).

According to the embodiment of FIG. 3, the diagnostic logic is provided in the adapter 1. The adapter 1 provides a web server. On the mobile terminal 14, the user starts a web browser and connects to the web server of the adapter 1 to carry out the vehicle diagnostics.

First, a communication connection is established between the adapter 1 and the vehicle control device 10 (S30). Afterwards (or before or at the same time), a communication connection is established between the adapter 1 and the mobile terminal 14 (S40). Now, the adapter 1 is able to mediate communication or data between the mobile terminal 14 and the vehicle control device 10. The user indicates via the input unit of the mobile terminal 14 that he wishes to start the vehicle diagnostics. The mobile terminal then transmits a corresponding control command to the adapter (S41).

Usually, an identification of the vehicle is required so that the adapter 1 can assign the error codes to a specific vehicle type. Therefore, the adapter 1 sends (S31) a request to the vehicle control device 10 to identify the vehicle. The vehicle control device 10 then transmits (S32) the vehicle identification number (VIN) of the vehicle, which number may be stored in a memory in the vehicle, to the adapter 1. In alternative embodiments, the vehicle identification is entered manually by a technician or vehicle mechanic at the adapter 1 or at the mobile terminal 14 and sent to the adapter. Now, the VIN is known to the adapter 12.

After this, the adapter 1 can for example request error codes from the vehicle control device 10 (S33). The vehicle control device 10 then sends (S34) the requested error codes to the adapter 1. After reception, the error codes can be analysed or evaluated by the adapter 1.

For a more precise diagnosis, the adapter 1 can additionally request sensor readings from the vehicle control device 10. This is done, for example, via a request sent from the adapter 1 to the vehicle control device 10 (S35). The vehicle control device 10 retrieves the requested sensor readings, for example, from a vehicle memory or addresses corresponding vehicle sensors to issue or acquire the sensor readings. The sensor readings are then sent from the vehicle control device 10 to the adapter 1 for further evaluation or processing (S36). Based on the error codes and sensor readings, the adapter 1 can carry out vehicle diagnostics and the adapter 1 can determine which component in the vehicle is defective and requires repair.

In the last step (S42), the adapter 1 transmits the results of the vehicle diagnostics to the mobile terminal 14. The results are then displayed on the touch-sensitive screen of the mobile terminal 14.

At this point it should be noted that certain transmitting and receiving steps can be combined. For example, steps S33 and S35; S34 and S36 can in each case be combined.

Further, the mobile terminal 14 can send commands to the vehicle control device 10 via the adapter 1. For example, a command to the vehicle control device 10 comprises a setting of the sensor or a change in the setting of the sensor, the setting including, for example, a sensitivity of the sensor, a frequency of the measurements and/or a timing of the measurements.

Additionally or alternatively, the status of the vehicle control device 10 can be changed or set by the mobile terminal 14 via a corresponding message. Conceivable in this context would be, for example, inspection interval, control of actuators or the like.

The vehicle control device 10 may also receive new software components or updates, which the mobile terminal 14 sends to the relevant vehicle control device 10 via the adapter 1. In order to maintain communication between the adapter 1 and the vehicle control device 10 and/or between the adapter 1 and the mobile terminal 14, a so-called "keepalive signal" (maintenance signal) can be sent from the first communication unit to the vehicle control device 10 and/or to the mobile terminal 14. This is preferably done at regular intervals.

The housing 2 is only fastened to the vehicle for the duration of the vehicle diagnostics. After carrying out the vehicle diagnostics, the housing 2 is removed from the vehicle and the connection of the plug 3 to the diagnostic interface is broken. The communication connection of the adapter 1 to the vehicle control device 10 is thus also broken. The communication connection of the adapter 1 to the vehicle control device 12 and/or the mobile device 14 may be maintained or, alternatively, may also be broken.

It is understood that the embodiments shown in FIGS. 1 and 3 and described above may be combined with one another, provided that the combinations are not mutually exclusive. Features mentioned only in relation to the adapter 1 can also be claimed for the system or the method and vice versa.

LIST OF REFERENCE SIGNS

1 Adapter
2 Housing
3 Plug
4 Extension cable
5 Fastening means
6 Window pane
7 Winding groove
8 Receptacle
9 Anti-slip body
10 Vehicle control device
11 Anti-slip body
12 Vehicle diagnostic device
14 Mobile terminal
15 Lower housing area
16 Upper housing area
100 System
200 System

The invention claimed is:

1. An adapter, comprising:
   a housing;
   a plug to connect to a vehicle diagnostic interface of a vehicle;
   an extension cable connected to the plug;
   a first communication unit connected to the extension cable, wherein the first communication unit is configurable to communicate wirelessly with at least one of a vehicle diagnostic device, a mobile terminal, or at least one vehicle control device connected to the vehicle diagnostic interface; and
   a fastening member for attaching the housing to at least one of a vehicle exterior, a window pane, a vehicle door, a vehicle pillar, or a vehicle roof, wherein the fastening member is designed in such a way that the housing protrudes at least partially from an interior of the vehicle to an exterior portion of the vehicle after the housing has been attached to the vehicle.

2. The adapter according to claim 1, wherein the fastening member comprises at least one of a protrusion, a bracket, a hook, a clamp, a suction cup, hook-and-loop fastener, or a magnet.

3. The adapter according to claim 1, further comprising:
a winding unit for winding up the extension cable, wherein the winding unit includes a winding groove or a winding drum for completely receiving the extension cable.

4. The adapter according to claim 3, wherein the winding unit has a radius of curvature of at least six times an outer diameter of the extension cable.

5. The adapter according to claim 1, further comprising:
a receptacle included in the housing for receiving the plug in a rest position of the adapter.

6. The adapter according to claim 5, wherein the housing includes a locking member for locking the plug in the receptacle.

7. The adapter according claim 1, wherein at least one of the fastening member or the housing include at least one anti-slip body, which, when the adapter is fastened to the vehicle, is designed to inhibit movement between the adapter and the vehicle.

8. The adapter according to claim 1, wherein at least one of the fastening member or the housing are designed in such a way that the housing abuts the window pane when the adapter is mounted on the window pane.

9. The adapter according to claim 1, wherein the extension cable has a length of at least 0.5 meters and/or at most 2 meters, and/or wherein the extension cable includes at least two signal cores.

10. The adapter according to claim 1, wherein the first communication unit is configurable to transmit data between at least one of the vehicle diagnostic device and the at least one vehicle control device or the mobile terminal and the at least one vehicle control device.

11. The adapter according to claim 1, wherein the first communication unit is configurable to:
receive data from at least one of the vehicle diagnostic device, the at least one vehicle control device, or the mobile terminal; and
forward the data to at least one of the at least one vehicle control device, the vehicle diagnostic device, or the mobile terminal.

12. The adapter according to claim 11, wherein the data includes at least one of at least one data packet, or vehicle data.

13. The adapter according to claim 1, further comprising:
an input and output unit for communication with a user, wherein the first communication unit is configurable, after an input by a user at the input and output unit, to establish a communication connection with at least one of the vehicle diagnostic device, the at least one vehicle control device, the mobile terminal, or to at least one of receive, forward, or evaluate data.

14. A method for using an adapter, the adapter comprising:
a housing;
a plug to connect to a vehicle diagnostic interface of a vehicle;
an extension cable connected to the plug;
a first communication unit connected to the extension cable, wherein the first communication unit is configurable to communicate wirelessly with at least one of a vehicle diagnostic device, a mobile terminal, or at least one vehicle control device connected to the vehicle diagnostic interface; and
a fastening member for attaching the housing to at least one of a vehicle exterior, a window pane, a vehicle door, a vehicle pillar, or a vehicle roof, wherein the fastening member is designed in such a way that the housing protrudes at least partially from an interior of the vehicle to an exterior portion of the vehicle after the housing has been attached to the vehicle, and wherein the method comprises:
connecting the plug to the vehicle diagnostic interface;
attaching the housing to at least one of the vehicle exterior, the window pane the vehicle door, the vehicle pillar, or the vehicle roof with the fastening member;
establishing a communication connection between the first communication unit of the adapter and the at least one vehicle control device; and
establishing a communication connection between the first communication unit of the adapter and at least one of the vehicle diagnostic device or the mobile terminal.

15. The method according to claim 14, wherein the housing is attached to the vehicle only while performing a vehicle diagnostic, wherein, once the vehicle diagnostic is complete, at least a mechanical connection of the fastening member is released from the vehicle.

16. The method of claim 14, wherein the mobile terminal includes a second communication unit configurable for wireless communication with the first communication unit, and wherein the adapter further includes a control and processing unit configurable for evaluation of data from the at least one vehicle control device.

17. A system comprising:
an adapter, the adapter including:
a housing;
a plug to connect to a vehicle diagnostic interface of a vehicle;
an extension cable connected to the plug;
a first communication unit connected to the extension cable, wherein the first communication unit is configurable to communicate wirelessly with at least one of a vehicle diagnostic device, a mobile terminal, or at least one vehicle control device connected to the vehicle diagnostic interface;
a fastening member for attaching the housing to at least one of a vehicle exterior, a window pane, a vehicle door, a vehicle pillar, or a vehicle roof, wherein the fastening member is designed in such a way that the housing protrudes at least partially from an interior of the vehicle to an exterior portion of the vehicle after the housing has been attached to the vehicle; and
a vehicle diagnostic device, wherein the vehicle diagnostic device includes a second communication unit configurable for wireless communication with the first communication unit, and a control and processing unit configurable for evaluation of data transmitted from the at least one vehicle control device to the first communication unit.

18. The system of claim 17, wherein the first communication unit is configurable to:
receive the data from the at least one vehicle control device; and
forward the data to from the at least one vehicle control device to the second communication unit.

19. The adapter according to claim 12, wherein the vehicle data includes at least one of, a sensor reading, an error code, a vehicle identification, a message, a request, a confirmation or a command.

20. The adapter according to claim 1, wherein the first communication unit is arranged at least partially outside the vehicle in a position of the adapter.

* * * * *